US009663605B2

(12) United States Patent
Adam

(10) Patent No.: US 9,663,605 B2
(45) Date of Patent: May 30, 2017

(54) POLYMERIC ENERGY STORAGE MATERIALS

(71) Applicant: EMPIRE TECHNOLOGY DEVELOPMENT LLC, Wilmington, DE (US)

(72) Inventor: Georgius Abidal Adam, Edensor Park (AU)

(73) Assignee: Empire Technology Development LLC, Wilmington, DE (US)

(*) Notice: Subject to any disclaimer, the term of this patent is extended or adjusted under 35 U.S.C. 154(b) by 444 days.

(21) Appl. No.: 13/825,858

(22) PCT Filed: Oct. 31, 2012

(86) PCT No.: PCT/US2012/062686
§ 371 (c)(1),
(2) Date: Mar. 25, 2013

(87) PCT Pub. No.: WO2014/070154
PCT Pub. Date: May 8, 2014

(65) Prior Publication Data
US 2014/0170346 A1    Jun. 19, 2014

(51) Int. Cl.
*B01J 45/00* (2006.01)
*C08F 255/02* (2006.01)
*C08L 23/26* (2006.01)
*C09K 5/06* (2006.01)

(52) U.S. Cl.
CPC ............. *C08F 255/02* (2013.01); *B01J 45/00* (2013.01); *C08L 23/26* (2013.01); *C09K 5/063* (2013.01); *Y10T 428/1352* (2015.01)

(58) Field of Classification Search
CPC ....... C08F 255/02; C08L 23/26; C09K 5/063; B01J 45/00; Y10T 428/1352
See application file for complete search history.

(56) References Cited

U.S. PATENT DOCUMENTS

| | | | |
|---|---|---|---|
| 4,825,939 A | 5/1989 | Salyer et al. | |
| 5,053,446 A | 10/1991 | Salyer | |
| 5,366,801 A | 11/1994 | Bryant et al. | |
| 5,420,303 A | 5/1995 | Roberts et al. | |
| 5,755,216 A | 5/1998 | Salyer | |
| 7,896,033 B2 | 3/2011 | Hallot et al. | |
| 2009/0199994 A1 | 8/2009 | Amano | |
| 2009/0227451 A1 | 9/2009 | Rose et al. | |
| 2010/0012883 A1 | 1/2010 | Hartmann et al. | |
| 2010/0015430 A1 | 1/2010 | Hartmann et al. | |

FOREIGN PATENT DOCUMENTS

| | | |
|---|---|---|
| CN | 101530772 A | 9/2009 |
| EP | 0789215 A2 | 8/1997 |
| WO | WO 01/35511 A2 | 5/2001 |
| WO | 2011079845 A1 | 7/2011 |

OTHER PUBLICATIONS

International Search Report and Written Opinion for PCT/US2012/062686 dated Jan. 23, 2013.
Advanced Phase Change Material (PCM) Market: Global Forecast (2010-2015), published Jul. 2010.
Dowex® Ion Exchange Resins, http://www.serva.de/enDE/Catalog/89_Ion_Exchange_Media_DOWEX_reg_Ion_Exchange_Resins.html (Printed from Internet Feb. 6, 2013).
DuPont™ Energain®, The Homepage of Energain®, Solution to Thermal Mass in Low Inertia Buildings, http://energain.co.uk/Energain/en_GB/ (Printed from Internet Feb. 14, 2013).
Kenisarin et al., Renewable and Sustainable Energy Reviews, *Renewable and Sustainable Energy Reviews* (Dec. 2007), 11(9):1913-1965 (Abstract).
Khalaf et al., Rheological Studies of Modified Maleated Polyethylene/Medium Density Polyethylene Blends, *Malaysian Polymer Journal (MPJ)* (2008), 3(2):54-64.
Lindner, Bases Physicotechniques Latent Heat Accumulators. Part 1. Physico-Technical Fundamentals, *Brennstoff-Kraft-Wärme* (1984), 36(7-8):323-326 (Abstract).
Mondal, Phase change materials for smart textiles—An overview, *Applied Thermal Engineering* (Aug. 29, 2007), 28:1536-1550.
Phase Change Materials PCM Manufacturers for Air Conditioning, Electronics . . . http://www.teappcm.com/ (Printed from Internet Mar. 21, 2013).
Phase Change Materials, Technical & Design Guide Encapsulated PCMs, http://www.pcmproducts.net/PCM_Technical_Design_Guide.htm (Printed from Internet Mar. 21, 2013).
Phase Change Materials: The Techwer Weblog, http://www.techwear-weblog.com/50226711/phase_change_materials.php (Printed from Internet Feb. 6, 2013).
Prince, Phase Change Materials: Overview, http://www.fibre2fashion.com/industry-article/printarticle.asp?article_id=884&page=2 (Printed from Internet Feb. 6, 2013).
Shi et al., Study on Transition Characteristics of Poly(Ethylene Glycol)/ Selected Fatty Acids Phase Change Materials, *Materials Science Forum* (Apr. 2009), 620-622:49-52 (Abstract).
Su et al., Behavior of microencapsulated phase change material/epoxy composites (Oct. 24, 2011), http://www.4spepro.org/view.php?article=003865-2011-10-24&category=Composites.
The Art of Handing Air | TROX, http://www.troxtechnik.com/en/ (Printed from Internet Mar. 21, 2013).
Tuncbilek et al., Lauric and palmitic acids eutectic mixture as latent heat storage material for low temperature heating applications, *Energy* (Apr. 2005), 30(5):677-692 (Abstract).
ZAE Bayern, Division 2: Functional Materials for Energy Technology, http://www.zae.uni-wuerzburg.de/english/division-2/ (Printed from the Internet Mar. 21, 2013).
ZAE Bayern, Latent Heat Storage Materials for Increased Thermal Comfort, http://www.zae.uni-wuerzburg.de/english/division-2/special-topics/pcm.html (Printed from Internet Mar. 21, 2013).

*Primary Examiner* — Irina S Zemel
*Assistant Examiner* — Jeffrey Lenihan
(74) *Attorney, Agent, or Firm* — Pepper Hamilton LLP

(57) ABSTRACT

Compositions, coatings, and energy storage fabrications made of support polymers or active waxes in a grafted matrix to an amorphous wax and at least one functional compound and their methods of preparation are presented. Amorphous waxes are typified by paraffin waxes. Functional compounds include various fatty alcohols, fatty acids, ester, amines, and amidoalkylamines. Sulfonated and oxidized ion exchange resins may be grafted to the matrix. The compositions are capable of storing or releasing energy upon a physical phase change transition.

15 Claims, 2 Drawing Sheets

POLYMERIC ENERGY STORAGE MATERIALS

CROSS-REFERENCE TO RELATED APPLICATION

This application is a U.S. national stage filing under 35 U.S.C. §371 of International Application No. PCT/US2012/062686, entitled "Polymeric Energy Storage Materials", filed on Oct. 31, 2012, which is incorporated herein by reference in its entirety.

BACKGROUND

Energy storage or phase change materials (PCMs) are able to store and release large amounts of energy at temperatures where a physical phase change occurs (e.g., solid-liquid, liquid-solid transitions). Phase change materials have a high heat of fusion which means they are particularly useful to control heat energy transfer. The primary applications in which phase change materials can be useful are when heating or cooling infrastructures are not available such as during camping or travelling, military operations, medical applications, and other situations that require convenient access to temperature-controlled products.

Phase change materials offer tremendous potential to fulfill the growing energy needs for cooling and heating applications across various industries, including construction, commercial refrigeration, textiles, and smart food packaging. Building and construction currently forms the largest application market due to the globally increasing demand for cooling buildings, which in turn has arisen due to the shift from heavy thermal mass design to lightweight architecture. The use of the passive phase change material technology is expected to boost the global efforts to conserve energy in the wake of fast depleting fossil fuels. However, effective integration of phase change materials in end-products remains a challenging task.

Of the known phase change materials, polymeric-based materials represent the most widely used category due to their low density, and ease of processing. Most of the commercially available phase change materials are simple paraffinic-based composite materials encapsulated in a containment vessel in the desired form factor. Commercial paraffin wax alone is often not practical because of its relative inefficiency and high transition temperature. Paraffinic-based composite phase change materials typically have low efficiency and are expensive, especially if pure or virgin hydrocarbons are used. Recently, DuPont released an advanced paraffinic-based copolymer product from virgin hydrocarbons in sheet form intended for use in commercial and domestic floor heating.

There remains unmet needs for improved phase change materials that further tailor transition temperatures and maximize stored energy, eliminate the need for a separate containment vessel, are made from waste streams, and that are food safe or GRAS (Generally Recognized As Safe) approved.

SUMMARY

Presently disclosed is a new class of polymeric energy storage materials that have tailorable phase transition temperatures (above and below room temperature) and a higher enthalpy of transition than traditional paraffinic phase change materials. The disclosed phase change materials can be manufactured as part of a polymeric substrate matrix, thus providing a framework for the incorporation of other organic and inorganic phase change materials into the structure. The final phase change material product can be formed to any shape or cut to any size, and would not require a separate containment vessel.

The compositions of these new phase change materials comprise active paraffin waxes, fatty acids, and quaternary ammonium salts with capability of being transferred to both hydrophilic and hydrophobic hydrogels. Furthermore, the disclosed phase change materials can be readily prepared from industrial wastes and recycled polymers such as LDPE (low-density polyethylene) or HDPE (high-density polyethylene), waste ion exchange resins, waste olive oil and waste fatty oils. The active paraffin wax base (up to 80%) could be loaded with these highly efficient phase change material functionalities that enhance heat of fusion or transition enthalpies (carboxylate groups, fatty acids, quaternary ammonium salts, fatty acid adducts), and/or possess hydrophilic functional groups such as carboxylated wax amine adducts, sulfonated modified ion exchange resin wastes (anion and cation exchange resins). Some embodiments of these tailored phase change materials have melting points near ambient temperature (30° C.-50° C.) with transition enthalpies in a range 30-40% higher (150-250 kJ/kg) than reported for paraffin waxes, with the structural properties of partially cross-linked polyethylene. This "self-containment" feature represents an important breakthrough on the path to making phase change materials ubiquitous.

New phase change materials based on carboxylated wax amine adducts cross-linked with water based epoxy can be tailored as hydrophilic phase change materials that contain a desired quantity of water (water is an extremely effective phase change material) in addition to the grafted paraffinic constituents as another efficient phase change material source.

New tailored phase change materials described in this disclosure could be used as a self-contained phase change material sheet, film, or panel formed to any shape or cut to any size required. If used as a master batch for forming energy storage sheets, panels, boards for roofs, walls, containers, packaging, heating plates, medical equipment, cooling sinks for organ transfer, vaccine and blood transportation, or disposable containers for hot or cold foods. These phase change materials could also be used as "containment" or "encapsulating" material for other organic and inorganic phase change materials.

Some embodiments include a composition comprising at least one support polymer grafted to at least one amorphous wax and further grafted to at least one functional compound having a phase change active group, wherein the composition is capable of storing or releasing energy upon a physical phase change transition.

Other embodiments include a coating material comprising a grafted matrix of at least one active wax and at least one amorphous wax having at least one phase change active group wherein the at least one phase change active group is a fatty alcohol, fatty carboxylic acid, unsaturated fatty alcohol, unsaturated fatty acid, alkyl fatty ester, unsaturated fatty alkyl ester, fatty acid anhydride, unsaturated fatty anhydride, fatty amine, unsaturated fatty amine, fatty amidoalkylamine, unsaturated fatty amidoalkylamine, or combinations thereof.

Still other embodiments include a method for preparing a phase change material, the method comprising melting a composition of at least one polymer, at least one amorphous wax, at least one functional compound having a phase change group, and a peroxide; and grafting the composition.

Yet another embodiment is a method for preparing a phase change material, the method comprising combining at least one lubricating oil wax, at least one polymeric grafting reagent, and a peroxide grafting agent to form a mixture; and grafting the mixture until the mixture forms a solid matrix at ambient temperature.

Another embodiment is an energy storage fabrication comprising of a grafted matrix comprising of at least one polymer, at least one amorphous wax, and at least one functional compound having a phase change active group, wherein the fabrication is capable of storing or releasing energy upon a reversible physical phase change transition.

Still another embodiment is a compounded mixture comprising at least one support polymer, at least one amorphous wax, and at least one functional compound having a phase change active group forming network matrix, wherein the composition is capable of storing or releasing energy upon physical phase change transitions.

DETAILED DESCRIPTION

Figure 1:
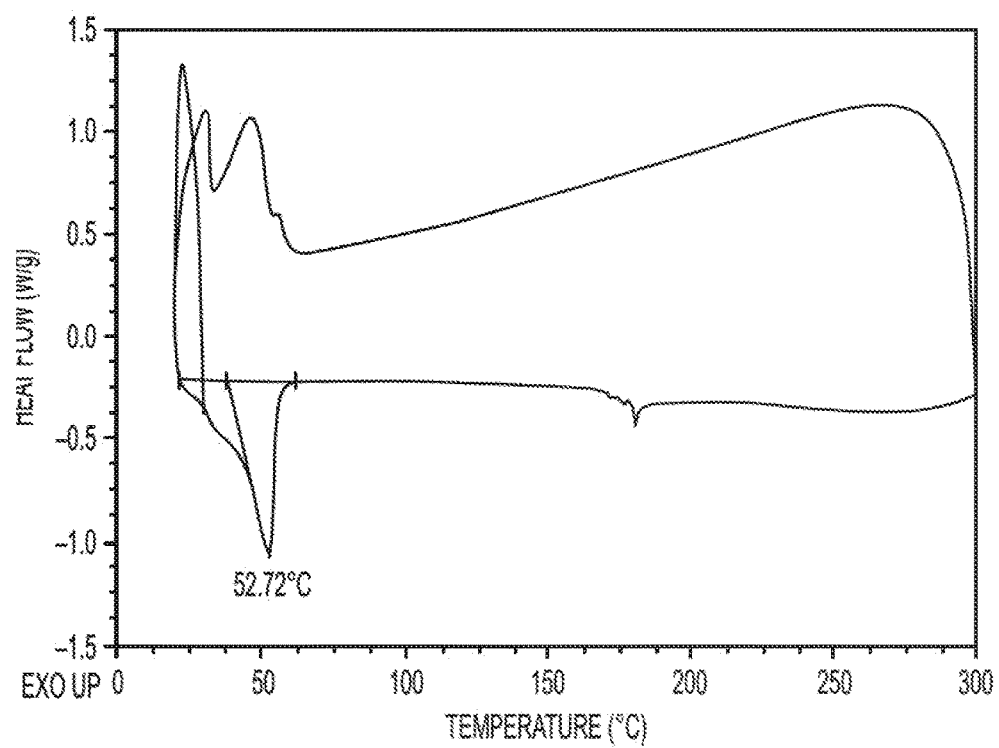
FIG. 1: Differential Scanning calorimeter thermogram for the modified lubricating wax. The upper curve is cooling curve at 5° C./minute.

Embodiments include a range of new phase change material, materials that can be synthesized from modified lubricating wax grafted with series of high functionality phase change materials sourced from virgin and waste materials. Many of them are also produced in a containment matrix form that makes them ideal for use for a number of existing and new applications.

As used herein the term "amorphous wax" refers to those hydrocarbons having a melting point above about 37° C., a low viscosity when melted, insoluble in water and hydrophobic. Amorphous waxes can be natural origin or artificial. Several different categories of amorphous waxes are known for example animal waxes, insect waxes, mineral waxes, petroleum waxes, vegetable waxes, and synthetic waxes. Petroleum waxes are of two types, paraffin, containing a majority of straight chain paraffins, and microcrystalline, containing a substantial amount of branch chain paraffins. Paraffin waxes may have average molecular weights of about 280-560 and about 20 to about 40 carbons in the basic carbon chain. Suitable amorphous waxes for use herein include bayberry wax, beeswax, candelilla wax, carnauba wax, castor wax, ceresin waxes, douglas-fir bark wax, Fischer-Tropsch wax, japan wax, jojoba wax, lanolin, microcrystalline wax, montan wax, ouricury wax, ozokerite wax, paraffin wax, peat wax, petroleum wax, polyethylene wax, rice bran wax, spermaceti wax, chemically modified hydrocarbon wax and substituted amide wax.

As used herein "support polymer" includes substituted or unsubstituted polyolefin, vinyl polymers, virgin or waste, and mixtures thereof.

The term "physical compounding" is employed to define and describe the discrete physical relationship of the two respective thermoplastic materials. In the described process, once compounding is complete, the resulting material can be cooled to a temperature below which solidification of the resulting thermoplastic compound occurs. While the materials remain in a dispersed state relative to one another, the two materials retain discrete regions of identifiable polymeric materials with little evidence of chemical bonding between the two materials.

As used herein "graft" means that an additive (including, for example, an amorphous wax or reactive agent) is not readily separable from a support polymer, e.g., the additive cannot be removed from the support polymer by rinsing with a solvent. Grafted additives, therefore, include an additive that is covalently bonded to the support polymer and also part of an interpenetrating matrix by intermolecular forces, but not covalently bound, with the support polymer. Methods for measuring the amount of grafting are weight differences before and after extraction with a suitable solvent, either by extraction in an extractor such as a Soxhlet extractor, or by dissolving the grafted polymer and re-precipitating it in a non-solvent, NMR measurements, or by elemental analysis (for example when fluorine containing grafting ingredients are used).

As used herein "grafting" means a chemical reaction that forms a covalent bond between a first ingredient and a second ingredient. The ingredients may be a support polymer, an active wax, an additive, an amorphous wax, and combinations thereof. The amount of first ingredient actually grafted onto the second ingredient typically ranges from about 1 percent to about 70 percent, preferably about 1 percent to about 50%, of the original weight of the second ingredient. This may vary widely on a molar basis, depending on the molecular weight of the first ingredient. For example, some of a support polymer (first ingredient) may be covalently bonded to additive molecules (second ingredient), while other additive molecules are covalently bonded to third ingredients or held without covalent bonding to the interpenetrating matrix. Similarly, a fraction of the molecules of an amorphous wax may be covalently bonded to an active wax, while other molecules of the amorphous wax may be covalently bonded to other amorphous wax molecules or held without covalent bonding in the interpenetrating matrix. The chemistry of grafting that takes place in these reactions is simple and familiar Reactions begin with decomposition of peroxides near their decomposition temperatures to form free radicals, which undergo chain transition to paraffinic wax chains and/or polyolefin chains. Active free radicals undergo coupling with any other free radicals formed in the process. Free radicals are then available to couple with any free radicals from the reactive agents added: including, but not limited to, maleic acid, maleate esters, unsaturated fatty alcohols, polystyrene exchange resin; cations and anions, sulphonated cross-linked polystyrene (strong acidic) and weak acidic (based on polystyrene acrylate), or quaternary ammonium salts of degraded anionic exchange resin based on polystyrene, and amine derivatives.

Presently disclosed are tailor-made phase change materials made by grafting active phase change material ingredients on chemically modified amorphous wax. These products are suitable for this application as they do not leach out due to the chemical grafting.

In some embodiments of the disclosed composition, the composition comprises at least one support polymer grafted to at least one amorphous wax. In some embodiments, the composition is further grafted to at least one functional compound. In various embodiments, the functional compounds have a phase change active group. In all embodiments, the composition is capable of storing or releasing energy upon a physical phase change transition. The physical phase change transition may be from a solid to a melt, a melt to a solid, or a secondary transition from one solid form to another solid form. Macroscopically, the melt may appear as a mere softening of the solid, while retaining its overall shape. The phase change transition can be a change of alignment of hydrocarbon chains. For example, in one solid form, straight chain hydrocarbon chains in an additive are aligned with one another, and in another solid form, the hydrocarbon chains are disposed randomly. Microscopically, a melt and a secondary transition of solids form a continuum and are referred to as a physical phase change transition. In the various embodiments, the composition may further comprise water. In the various embodiments with at least one functional compound, the functional compound may be predominantly un branched.

The physical phase change transition may occur at 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., and at a temperature or range between any two of these values. Example embodiments include a physical phase change occurring at about 20° C. to about 60° C., a temperature of about 30° C. to about 50° C., a temperature of about 35° C. to about 45° C. The physical phase change transition may occur over a small or sharp temperature range, or may occur over a large or broad temperature range. There may be a plurality of physical phase changes over a broad range of temperatures.

In some embodiments, the composition comprises at least one functional compound. Functional compounds may be a fatty alcohol, an unsaturated fatty alcohol, fatty acid, unsaturated fatty acid, alkyl fatty ester, alkyl unsaturated fatty ester, fatty acid anhydride, unsaturated fatty anhydride, fatty amine, unsaturated fatty amine, fatty amidoalkylamine, unsaturated fatty amidoalkylamine, or combinations thereof.

When the functional compound is a fatty acid or unsaturated fatty acid, the functional compound may be $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl(COOR)(COOR'), and either R or R' or both are hydrogen, alkyl, or a cation ion such one of as Na, K, Mg, Ca, Mn, Fe, and Co. When the functional compound is a fatty ester or unsaturated fatty ester, the functional compound may be $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl(COOR)(COOR'), and either R or R' or both are independently a $(C_1-C_{28})$alkyl, or a glyceride.

In some embodiments, the functional compounds include at least one compound of the formula $(C_{10})$alkyl(COOR)(COOR'), $(C_{10})$alkenyl(COOR)(COOR'), or combinations thereof; and R and R' are independently hydrogen or $(C_{10}-C_{28})$alkyl. Some embodiments include at least one functional compound having the formula $(C_{10}-C_{27})$alkyl-$CO_2H$, $(C_{10}-C_{27})$alkenyl-$CO_2H$, $(C_{10}-C_{26})$alkyl(COOH)$_2$, $-(C_{10}-C_{26})$alkenyl($CO_2H$)$_2$, or combinations thereof. Still other embodiments include at least one functional compound having the formula $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl($CO_2R$)(COOR'), or combinations thereof; and R and R' are independently $(C_1-C_{28})$alkyl.

Some embodiments include at least one functional compound which is a saturated or unsaturated amide. Saturated amides may include compounds with the formula $(C_{10}-C_{27})$alkyl-CONHR, $(C_{10}-C_{26})$alkyl(CONHR) (CONHR'), $(C_{10}-C_{26})$alkyl(CONHR)($CO_2H$), or combinations thereof, wherein R and R' are independently $-(CH_2CH_2Y)_x-CH_2CH_2NH_2$; Y is NH, O, or S; and x is 0, 1, 2, 3, or 4. Unsaturated amides may include compounds with the formula $(C_{10}-C_{27})$alkenyl-CONHR, $(C_{10}-C_{26})$alkenyl (CONHR) (CONHR'), $(C_{10}-C_{26})$alkenyl(CONHR)($CO_2H$), or combinations thereof, wherein R and R' are independently $-(CH_2CH_2Y)_x-CH_2CH_2NH_2$, Y is NH, O, or S; and x is 0, 1, 2, 3, or 4. In some embodiments, Y is NH. In other embodiments x is 0 or 1. In still other embodiments, x is 0.

In some embodiments, the functional compound may include an alkyl amine Some embodiments of functional compounds as alkyl amines may include a $(C_{10}-C_{28})$alkyl-$NR_1R_2R_3$, wherein $R_1$, $R_2$, and $R_3$ may be independently hydrogen or $-(C_1-C_{28})$alkyl. In some embodiments, the composition is further grafted to at least one epoxy resin.

Some embodiments include at least one functional compound which is a saturated or unsaturated alcohol. Saturated alcohols may include compounds with the formula $(C_{10}-C_{28})$alkyl-OH. In other embodiments, saturated alcohols may be $(C_{12}-C_{18})$alkyl-OH. Unsaturated alcohols may include compounds with the formula $(C_{10}-C_{28})$alkenyl-OH. In other embodiments, saturated alcohols may be $(C_{12}-C_{18})$alkenyl-OH.

In some embodiments at least one support polymer has a grafted ion exchange resin. Some embodiments have the support polymer grafted to at least one sulphonated ion exchange resin. In some embodiments, the support polymer is grafted to at least one oxidized ion exchange resin. The oxidized ion exchange resin may be an oxidized strong acid ion exchange resin. The oxidized ion exchange resin may an oxidized weak acidic ion exchange resin. The ion exchange resin may be an oxidized weak basic ion exchange resin. In various combinations, the ion exchange resin is a sulphonated ion exchange resin, an oxidized strong acidic ion exchange resin, oxidized weak acidic ion exchange resin, oxidized weak basic ion exchange resin, or combinations thereof.

Certain embodiments of compositions comprise at least one grafted amorphous wax. The amorphous wax may be bayberry wax, beeswax, candelilla wax, carnauba wax, castor wax, ceresin waxes, douglas-fir bark wax, Fischer-Tropsch wax, japan wax, jojoba wax, lanolin, microcrystalline wax, montan wax, ouricury wax, ozokerite wax, paraffin wax, peat wax, petroleum wax, polyethylene wax, rice bran wax, spermaceti wax, chemically modified hydrocarbon wax, substituted amide wax, or combinations thereof. In some embodiments, the amorphous wax is a paraffin wax. The paraffin wax may be a $(C_{20}-C_{40})$paraffin wax. The paraffin wax may be a $(C_{24}-C_{36})$paraffin wax.

Certain embodiments of compositions comprise at least one support polymer. The support polymer may be a polyolefin, a vinyl polymer, or combinations thereof. The polyolefin may be polyethylene, a low density polyethylene, a high density polyethylene, recycled polyethylene, waste polyethylene, or combinations thereof. The polyolefin may be a low density polyethylene. The polyolefin may be a high density polyethylene. The polyolefin may be polyethylene, recycled polyethylene, waste polyethylene, or combinations thereof. In some embodiments, at least one support polymer is polyethylene, and the support polymer is present in the composition at a concentration of about 0.5 weight % to about 10 weight % relative to the amorphous wax. In other embodiments, the at least one support polymer is polyethylene, and the support polymer is present in the composition at a concentration of about 5 weight % to about 10 weight % relative to the amorphous wax.

One aspect of the disclosed compositions is the characteristic of having a physical phase change that accompanies at least one physical phase change transition. The transition enthalpy may be measured by Differential Scanning calorimetry (DSC). In some embodiments, the composition has a transition enthalpy of about 150 kJ/kg to about 250 kJ/kg as determined by DSC. The transition enthalpy may be about 190 kJ/kg to about 250 kJ/kg in some embodiments. The transition enthalpy may be about 210 kJ/kg to about 250 kJ/kg in other embodiments. The transition enthalpy may be 100 kJ/kg, 110 kJ/kg, 120 kJ/kg, 130 kJ/kg, 140 kJ/kg, 150 kJ/kg, 160 kJ/kg, 170 kJ/kg, 180 kJ/kg, 190 kJ/kg, 200 kJ/kg, 210 kJ/kg, 220 kJ/kg, 230 kJ/kg, 240 kJ/kg, 250 kJ/kg, 260 kJ/kg, 270 kJ/kg, 280 kJ/kg, 290 kJ/kg, and a transition enthalpy or range between any two of these values. The transition enthalpy measurement may occur over a small or sharp temperature range, or may occur over a large or broad temperature range. The transition enthalpy is measured over the physical phase change temperature. There may be a plurality of smaller transition enthalpies measurable over the physical phase change temperature, with the total being the transition enthalpy.

Additional embodiments presently disclosed are a coating material, the coating material comprising a grafted matrix of at least one active wax, at least one amorphous wax, and at least one phase change active group. In some embodiments, the amorphous wax may comprise the phase change active group. In other embodiments, the amorphous wax may comprise a different compound than a functional compound having the phase change active group. In all embodiments, the coating material is capable of storing or releasing energy upon a physical phase change transition.

The active wax has a physical phase change transition which occurs at 0° C., 5° C., 10° C., 15° C., 20° C., 25° C., 30° C., 35° C., 40° C., 45° C., 50° C., 55° C., 60° C., 65° C., 70° C., 75° C., 80° C., 85° C., 90° C., and at a temperature or range between any two of these values. Example embodiments include a physical phase change transition occurring at about 20° C. to about 60° C., a temperature of about 30° C. to about 50° C., a temperature of about 35° C. to about 45° C. The physical phase change transition may occur over a small or sharp temperature range, or may occur over a large or broad temperature range. There may be a plurality of physical phase changes over a broad range of temperatures.

The coating material comprises at least one phase change active group. Phase change active groups may be a fatty alcohol, an unsaturated fatty alcohol, fatty acid, unsaturated fatty acid, alkyl fatty ester, alkyl unsaturated fatty ester, fatty amine, unsaturated fatty amine, fatty amidoalkylamine, unsaturated fatty amidoalkylamine, or combinations thereof.

When the phase change active group is a fatty acid or unsaturated fatty acid, the phase change active group may be $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl(COOR)(COOR'), and either R or R' or both are hydrogen, alkyl, or a cation that is Na, K, Li, Mg, Ca, Mn, Co, or Zn. When the phase change active group is a fatty ester or unsaturated fatty ester, the phase change active group may be $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl(COOR)(COOR'), and either R or R' or both are independently a $(C_1-C_{28})$alkyl, or a glyceride. In some embodiments, the phase change active group include at least one compound of the formula $(C_{10})$alkyl(COOR)(COOR'), $(C_{10})$alkenyl(COOR)(COOR'), or combinations thereof; and R and R' are independently hydrogen or $(C_1-C_{28})$alkyl. Some embodiments include at least one phase change active group having the formula $(C_{10}-C_{27})$alkyl-$CO_2H$, $(C_{10}-C_{27})$alkenyl-$CO_2H$, $(C_{10}-C_{26})$alkyl$(COOH)_2$, —$(C_{10}-C_{26})$alkenyl$(CO_2H)_2$, or combinations thereof. Still other embodiments include at least one phase change active group having the formula $(C_3-C_{27})$alkyl-$CO_2R$, $(C_3-C_{27})$alkenyl-$CO_2R$, $(C_2-C_{26})$alkyl(COOR)(COOR'), $(C_{10}-C_{26})$alkenyl($CO_2R$)(COOR'), or combinations thereof; and R and R' are independently $(C_1-C_{28})$alkyl.

Some embodiments include at least one phase change active group which is a saturated or unsaturated amide Saturated amides may include compounds with the formula $(C_{10}-C_{27})$alkyl-CONHR, $(C_{10}-C_{26})$alkyl(CONHR)(CONHR'), $(C_{10}-C_{26})$alkyl(CONHR)($CO_2H$), or combinations thereof, wherein R and R' are independently —$(CH_2CH_2Y)_x$—$CH_2CH_2NH_2$; Y is NH, O, or S; and x is 0, 1, 2, 3, or 4. Unsaturated amides may include compounds with the formula $(C_{10}-C_{27})$alkenyl-CONHR, $(C_{10}-C_{26})$alkenyl(CONHR)(CONHR'), $(C_{10}-C_{26})$alkenyl(CONHR)($CO_2H$), or combinations thereof, wherein R and R' are independently —$(CH_2CH_2Y)_x$—$CH_2CH_2NH_2$, Y is NH, O, or S; and x is 0, 1, 2, 3, or 4. In some embodiments, Y is NH. In other embodiments x is 0 or 1. In still other embodiments, x is 0.

In some embodiments, the phase change active group may include an alkyl amine Some embodiments may include the phase change active group as alkyl amines may include a $(C_{10}-C_{28})$alkyl-$NR_1R_2R_3$, wherein $R_1$, $R_2$, and $R_3$ may be independently hydrogen or —$(C_1-C_{28})$alkyl. In some embodiments, the active wax is further grafted to at least one epoxy resin.

Some embodiments include at least one phase change active group which is a saturated or unsaturated alcohol. Saturated alcohols may include compounds with the formula $(C_{10}-C_{28})$alkyl-OH. In other embodiments, saturated alcohols may be $(C_{12}-C_{18})$alkyl-OH. Unsaturated alcohols may include compounds with the formula $(C_{10}-C_{28})$alkenyl-OH. In other embodiments, saturated alcohols may be $(C_{12}-C_{18})$alkenyl-OH.

In some embodiments at least one active wax has a grafted ion exchange resin. Some embodiments have the active wax grafted to at least one sulphonated ion exchange resin. In some embodiments, the active wax is grafted to at least one oxidized ion exchange resin. The oxidized ion exchange resin may be an oxidized strong acid ion exchange resin. The oxidized ion exchange resin may an oxidized weak acidic ion exchange resin. The ion exchange resin may be an oxidized weak basic ion exchange resin. In various combinations, the ion exchange resin is a sulphonated ion exchange resin, an oxidized strong acidic ion exchange resin, oxidized weak acidic ion exchange resin, oxidized weak basic ion exchange resin, or combinations thereof.

Certain embodiments of the coating material comprise at least one grafted amorphous wax. The amorphous wax may be bayberry wax, beeswax, candelilla wax, carnauba wax, castor wax, ceresin waxes, douglas-fir bark wax, Fischer-Tropsch wax, japan wax, jojoba wax, lanolin, microcrystalline wax, montan wax, ouricury wax, ozokerite wax, paraffin wax, peat wax, petroleum wax, polyethylene wax, rice bran wax, spermaceti wax, chemically modified hydrocarbon wax, substituted amide wax, or combinations thereof. In some embodiments, the amorphous wax is a paraffin wax. The paraffin wax may be a $(C_{20}-C_{40})$paraffin wax. The paraffin wax may be a $(C_{24}-C_{36})$paraffin wax.

In another embodiment, the disclosure provides a method for preparing a phase change material. The method comprising melting a composition comprising of at least one polymer, at least one amorphous wax, at least one functional compound having a phase change group, and a peroxide; and grafting the composition by formation of covalent bonds between some of the polymer molecules, some of the wax molecules, and some of the functional compound molecules. The functional compound may comprise at least one fatty carboxylic acid and at least one functional amine compound, whereby an active wax amine carboxylate adduct is formed. The functional compound may comprise at least one functional amine compound, whereby an active wax amine epoxy adduct is formed. In various embodiments of the method, the amorphous wax is a paraffin wax.

Embodiments may have at least one functional compound of the formula $(C_{10}-C_{27})$alkyl-$NH_2$, $((C_{10}-C_{27})$alkyl$)_2NH$, $((C_{10}-C_{27})$(alkyl)$)_3N$, $(C_{10}-C_{27})$alkylN$H_2$, $(C_{10}-C_{27})$alkyl-COOH, $(C_{10}-C_{27})$alkyl-CONHR, $(C_{10}-C_{27})$alkenyl-CONHR, $(C_{10}-C_{26})$alkyl(CONHR) (CONHR'), $(C_{10}-C_{26})$alkenyl(CONHR')(CONHR'), $(C_{10}-C_{26})$alkyl(CONHR) ($CO_2H$), or $(C_{10}-C_{26})$alkenyl(CONHR)$CO_2H$, or combinations thereof; R and R' are independently $(CH_2CH_2Y)_x$—$CH_2CH_2NH_2$; Y is NH, O, or S; and x is 0, 1, 2, 3, or 4. In some embodiments, Y is NH. In other embodiments x is 0 or 1. In still other embodiments, x is 0.

In some embodiments, the functional compound may include an alkyl amine. Some embodiments may include the alkyl amine may include a $(C_{10}-C_{28})$alkyl-$NR_1R_2R_3$, wherein $R_1$, $R_2$, and $R_3$ may be independently hydrogen or $(C_1-C_{28})$alkyl. In some embodiments, the active wax is further grafted to at least one epoxy resin.

Embodiments of the method a phase change material is made whereby the material has at least one physical phase change transition. The transition enthalpy may be measured by Differential Scanning calorimetry (DSC). In some embodiments, the coating material has a transition enthalpy of about 150 kJ/kg to about 250 kJ/kg. The transition enthalpy measurement may occur over a small or sharp temperature range, or may occur over a large or broad temperature range. The transition enthalpy is measured over the physical phase change temperature. There may be a plurality of smaller transition enthalpies measurable over the physical phase change temperature, with the total being the transition enthalpy.

Other embodiments are a method for preparing a phase change material, the method comprising combining at least one lubricating oil wax, at least one polymeric grafting reagent, and a peroxide grafting agent to form a mixture; and heating the mixture until the mixture forms a solid matrix at ambient temperature.

The mixture may further comprise at least one fatty compound having at least one carboxyl functionality, amino functionality, or oxidized ion exchange resin, or combination thereof. In some embodiments, the mixture further comprises at least one fatty compound having at least one carboxyl functionality. In some embodiments of the method, the mixture further comprises at least one fatty alcohol.

The method may further comprise after grafting, reacting at least one alkyl polyamine with the at least one fatty compound to form an alkylaminocarboxylate adduct. In some embodiments, the at least one alkyl polyamine is ethylenediamine, diethylenetriamine, triethylenetetramine, tetraethylenepentamine, pentaethylenehexamine, polyalkylenepolyamine, piperazine, or combinations thereof. In other embodiments, the method further comprises reacting the alkylaminocarboxylate adduct with at least one terminal alkyl epoxide to form an epoxy amine adduct. In some embodiments, the peroxide grafting agent is at least one peroxide free radical initiator. In various embodiments, the grafting is performed at about 5-15° C. below a decomposition point of the peroxide grafting agent to about 5° C. below the decomposition point of the peroxide grafting agent. The grafting may use at least one peroxide free radical initiator at about 100° C. to about 130° C. with mixing for at least two hours.

In some embodiments, the at least one polymeric grafting reagent may be about 5 weight % to about 10 weight % of the mixture. In other embodiments, the peroxide grafting agent may be about 0.1 weight % to about 0.25 weight % of the combined mixture. In various embodiments, the polymeric grafting reagent is polyethylene and the peroxide grafting agent is a peroxide free radical initiator Embodiments of the method may have the mixture further comprising at least one ion exchange resin. In some embodiments, the ion exchange resin is an oxidatively degraded ion exchange resin. In other embodiments, the at least one ion exchange resin is a strong acidic sulfonate cation resin, a weak acid cationic resin, an anionic resin, or combinations thereof. The method may further comprise preparing the at least one oxidatively degraded ion exchange resin by contacting at least one ion exchange resin with a permanganate solution. In other embodiments, the contacting may be a heating of the ion exchange resin and permanganate solution. In various embodiments, the heating is at about 250° C. to about 275° C.

The phase change additive may be olive oil. The lubricating oil wax may be a paraffin wax. The lubricating oil wax may be a waste from a de-waxing process of a lubricating oil. The lubricating oil wax may be about 1 weight % to about 2 weight % of the combined mixture. The method may comprise recovering the lubricating oil wax may be recovered from lubricating oil. The recovering may be about 1 weight % to about 10 weight % of the lubricating oil.

Embodiments include an energy storage fabrication. The energy storage fabrication comprises a grafted matrix comprising of at least one polymer, at least one amorphous wax, and at least one functional compound. The functional compound has a phase change active group. The energy storage fabrications are capable of storing or releasing energy upon a reversible physical phase change transition. The energy storage fabrication may be a sheet, a panel, a roof board, a wall, a container, packaging, a heating plate, a cooling sink, or combinations thereof.

Embodiments include a compounded mixture. The compounded mixture comprises at least one support polymer, at least one amorphous wax, and at least one functional compound. The functional compounds have a phase change active group. The compounded mixture forms a network matrix capable of storing or releasing energy upon physical phase change transitions. In some embodiments, the at least one amorphous wax is a paraffin wax. In various embodiments, the at least one support polymer comprises a thermoplastic polymer compatible with wax. In some embodiments, the composition is compatible. The at least one support polymer may be a high density polyethylene, low density polyethylene, or combinations thereof. The at least one support polymer may be virgin polyethylene, recycled polyethylene, waste polyethylene, and combinations thereof.

EXAMPLES

Example 1

Preparation of Partially Cross-Linked Amorphous Paraffin Lubricating Wax

Paraffin wax from petroleum resources de-waxing of the lubricating oil units that contains 1-2% lubricating oil is heated to about 120° C. to about 130° C. according to the type of peroxide used in a reactor fitted with efficient mechanical stirrer and heating/cooling facilities. Polyethylene (0.5-10% (virgin or waste)) is dissolved into the paraffin melt. Peroxide (0.1-0.25%) is added to the mixture portion wise with efficient stirring under nitrogen atmosphere for about 1.5 to about two hours. When the melt viscosity is noticed to change and the melt solidify, the reaction is stopped.

Example 2

Typical Example of the Preparation of a Modified Lubricating Wax

Figure 2:
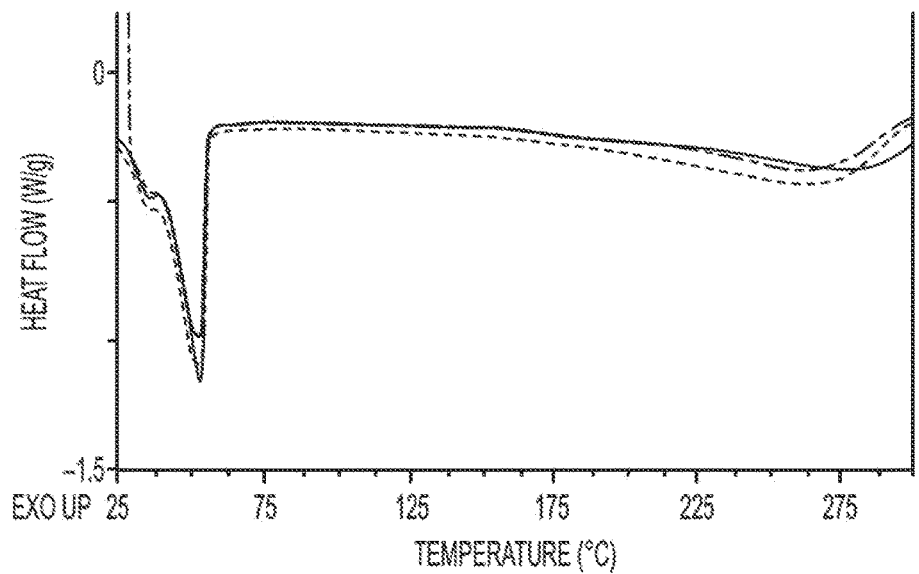
FIG. 2: Differential Scanning calorimeter thermogram of the modified wax showing its reversible behavior upon heating-quenching-heating for three cycles.

A 500 ml metal vessel was charged with 200 grams of paraffin wax from lubricating de-waxing unit of the petroleum refinery that contains 2.0% lubricating oil, was heated to 115° C.±5° C. by a thermostat controlled electric hot plate heater with mechanical mixing under nitrogen flow on the surface. Ten grams of a low density polyethylene (Dow Chemical Co LDPE 780E Melt flow rate 20) was added to the molten wax with mixing for ten minutes, then 0.2 grams of di t-butyl peroxide (decomposition temperature 126° C.) was added portion wise within 60 minutes to the molten wax with efficient mixing under a nitrogen flow stream. The heating was continued for about 1.5 hours. Samples were taken each 30 minutes. The samples were evaluated by thermal gradient apparatus. Identical molten samples were left to solidify under similar conditions. The rate of solidification was taken as a rough measure of the heat storage efficiency. Selected samples were tested by DSC. Typical DSC thermograms are shown in FIG. 1. The modified wax showed promising reversible behavior upon heating-quenching-heating for three cycles as shown in FIG. 2. DSC thermograms were determined on a DSC Q2000 V24.7 Build 119, carried out at 5° C./minute to 300° C., sample size approximately 10 mg.

Example 3

Preparation of Active Wax for Phase Change Material

Paraffin wax from petroleum resources that contained 1-2% lubricating oil is heated to about 120° C. to about 150° C. according to the type of peroxide used in a reactor fitted with efficient mechanical stirrer and heating/cooling facilities 5-10% polyethylene is dissolved/melted into the paraffin melt. Predetermined quantities of one or more of the following compounds is added to the molten wax: maleic anhydride, dialkyl maleate, succinic anhydride, dialkyl succinate, unsaturated fatty acids, fatty acid esters or esters from olive oil waste, unsaturated fatty alcohols or fatty alcohols, triglyceride fatty oils, in the presence of predetermined quantities of peroxides such as benzoyl peroxide or di-t-butyl peroxide, dicumyl peroxides and others which was added portion wise with efficient mixing.

Example 4

Figure 3:
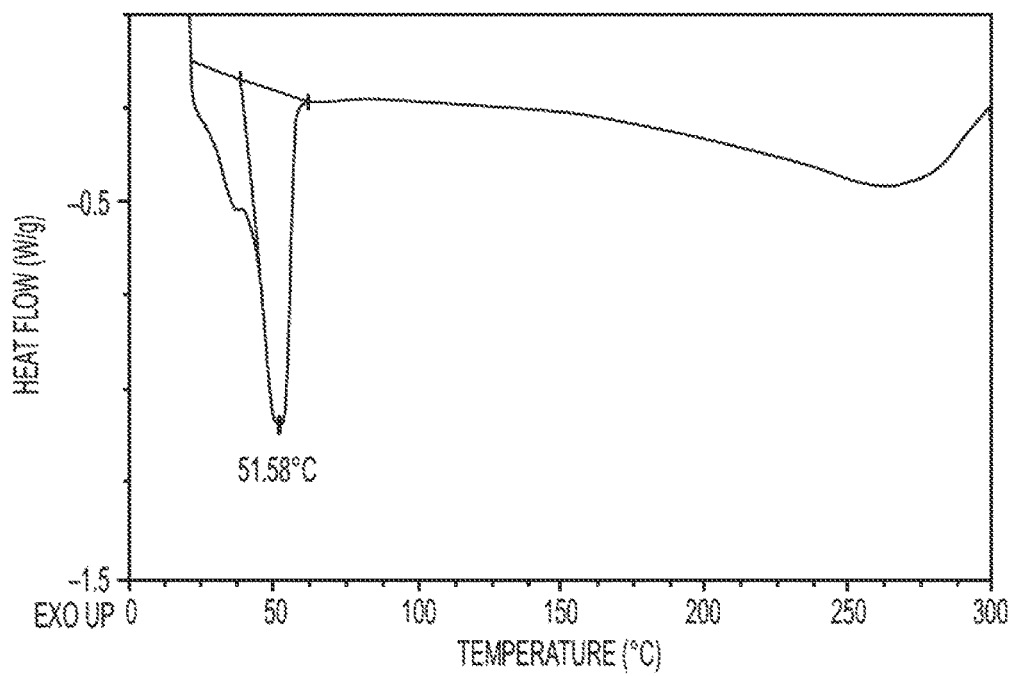
FIG. 3: Differential Scanning calorimeter curve for the modified paraffin wax comprising a phase change material with a grafted olive oil.

Typical Example Used in Grafting the Modified Active Wax and Olive Oil as an Additive Ingredient A 500 ml metal vessel was charged with 200 grams of paraffin wax from a lubricating de-waxing unit of a petroleum refinery with 2.0% lubricating oil. The mix was heated to 115° C.±5° C. by a thermostat controlled electric hot plate heater with mechanical mixing under nitrogen flow on the surface. Fifteen grams of low density polyethylene from Dow Chemical Company (LDPE 780E Melt flow rate 20) was added to the molten wax with mixing for ten minutes. Twenty grams of waste olive oil was added to the melt with continuous mixing under stream of nitrogen, then 0.2 grams of di t-butyl peroxide (decomposition temperature 126° C.) was added portion wise within 60 minutes to the molten wax composition with efficient mixing under nitrogen flow stream. The heating was continued for 1.5 hours. Samples were taken each 15 minutes the samples were evaluated by thermal gradient apparatus. Identical molten samples were left to solidify under similar conditions. The rate of solidification was taken as a rough measure of the heat storage efficiency. A typical DSC thermogram is shown in FIG. 3). The modified wax having the additive phase change material showed an increase in the heat of fusion from 132 J/g to 183.7 J/g with a melting transition range of about 39° C. to about 75° C. DSC thermograms were determined on a DSC Q2000 V24.7 Build 119, carried out at 5° C./minute to 300° C., sample size approximately 10 mg.

The effect of several factors on the degree of grafting, maleation, was studied; reaction time, molar ratio, concentration of the peroxide, and reaction temperature. The optimum grafting conditions of different functional groups that control the properties of the phase change material determined were as follows:

Peroxide concentration=0.1-0.25% of the paraffin wax/polyethylene.
Reaction time=1.5-2.0 hours.
Grafting reagent=10-30% of the paraffin wax/polyethylene.
Reaction atmosphere=$N_2$.
Phase change ingredient with the functional group=10-30% of the composition.

The partially cross-linked amorphous wax grafted with carboxylate, fatty alcohol, fatty acids, quaternary ammonium salts, sulphonated wax are then transferred to other active functionality phase change materials as follows:

Example 5

Typical Example for Preparation Procedure of a Carboxylated Wax

A 500 ml metal vessel was charged with 200 grams of paraffin wax from lubricating de-waxing unit of the petroleum refinery that contains 2.0% lubricating oil, was heated to 115 C-/+5° C. by a thermostat controlled electric hot plate heater with mechanical mixing under nitrogen flowing on the surface. Ten grams of low density polyethylene from Dow Chemical Company (LDPE 780E Melt flow rate 20) was added to the molten wax with mixing for ten minutes. Twenty grams maleic acid anhydride was added to the melt with continuous mixing under a stream of nitrogen, then 0.2 grams of di-t-butyl peroxide (decomposition temperature 126° C.) was added portion wise within 60 minutes to the molten wax composition with efficient mixing under a nitrogen flow stream. Heating was continued for about three hours. Samples were taken each 15 minutes. The samples were evaluated by continuous extraction of the unreacted maleic anhydride with boiling water for about 48 hours. Water was evaporated and the extracted maleic anhydride was determined from the residue. The % of grafting (non-extractable maleic anhydride) with boiling water was 87.8% of the reactant as average of three experiment. The carboxylated wax prepared by this procedure was used in the preparation of the carboxylated amine adducts.

Example 6

Preparation of Amine Adducts

Carboxylated waxes is transferred to its amine adduct by addition the predetermined equivalent quantities of alkyl polyamines (including for example, but not limited to: ethylene diamine, diethylenetriamine, and triethylenetetramine, and combinations thereof) to the molten carboxylated grafted wax or its emulsions as applicable with continuous mixing for about three hours. The carboxylated amine adducts wax show high hydrophilic characteristics which form a hydrogel when mixed with water. This property enhances the phase transition enthalpy. The amine adducts of paraffin wax offer good performance at a cost advantage over amine adducts of fatty acids.

Example 7

Representative Example for the Preparation of the Carboxylated Amine Adduct Waxes Reflux reaction system was charged 20 grams of the carboxylated wax prepared in Example (5) (comprising 8.8% of combined maleic anhydride), 50 g of diethylenetriamine was added. The contents were heated to 80° C. for about three hours with mixing. At the end of the reaction, the reactants were cooled to 10° C., the carboxylated amine adduct wax separates from the unreacted amine. The unreacted amine was evaporated under vacuum. The carboxylated wax amine adduct was found to be highly hydrophilic when suspended in water for about 24 hours. The % of combined water was 120%. The product was used in the preparation of the epoxidized wax presented in the following example as curing agent for water based epoxy resins.

Example 8

Preparation of Self-Contained Hydrophilic Active Wax

Hydrophilic amine-based waxes (sixty grams) was mixed with several molar ratios of raw lubricating wax and then partially cross-linked with twenty grams of water-based polyfunctional epoxy resins (polyethylene glycol diglycidyl ether) to produce a phase change material wax within the cross-linked epoxy matrix or "self-contained hydrophilic active wax." These materials showed the highest transition enthalpies (150-250 kJ/kg as determined by DSC of the different classes prepared, exceeding other reported paraffin wax based composites that have a transition enthalpy of 180-190 kJ/kg.

Example 9

Preparation of Hydrophobic Active Waxes

Hydrophobic emulsifiable active waxes were prepared by grafting cetyl alcohol, lauryl, oleyl alcohols, stearyl alcohols and other fatty alcohols on the lubricating waxes in the presence of peroxide adopting the procedure used in Example 1. These new hydrophobic wax derivatives showed excellent miscibility and compatibility with partially cross-linked wax prepared in Example 1 and paraffinic wax as well plus having transition temperatures near to ambient temperature, about 30° C. to about 50° C. These materials have particular application in water repellent products for the paint industry, anti-corrosion coatings, and construction as concrete curing agents and retention of water evaporation from water reservoirs such as dams, seeming pools, and hydrogel coating.

Example 10

Preparation of Hydrophobic Active Waxes using Cetyl Alcohol

Figure 4:
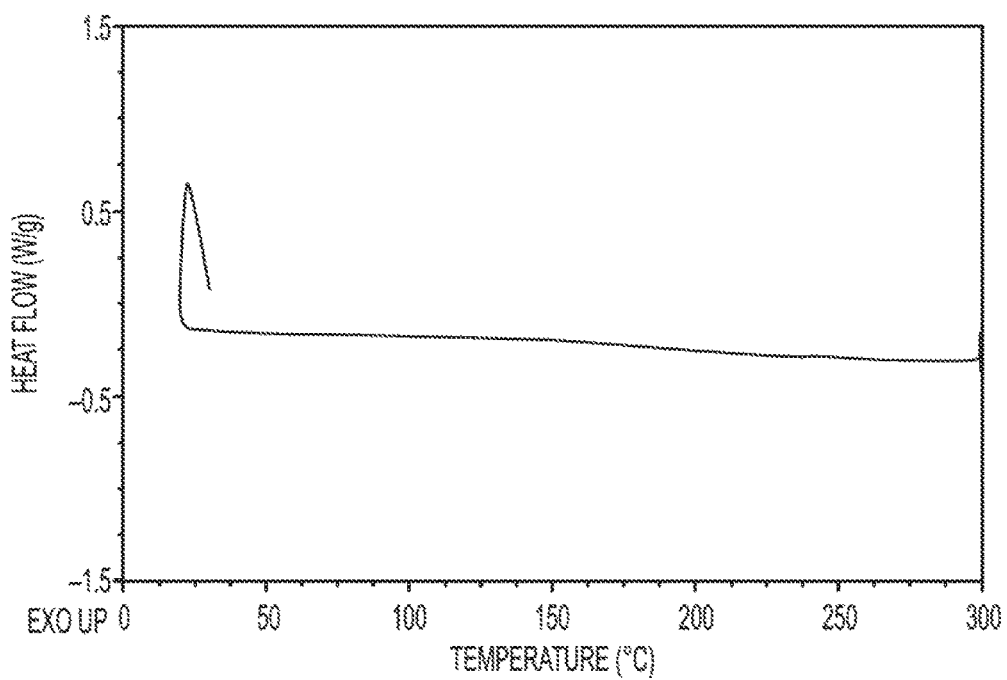
FIG. 4: Typical DSC thermogram for the modified lubricating wax comprising grafted cetyl alcohol.

The set up used in Example (1) was used. A 500 ml metal vessel was charged with 200 grams of paraffin wax from a lubricating de-waxing unit of the petroleum refinery that contains 2.0% lubricating oil, was heated to 115° C.±5° C. by a thermostat controlled electric hot plate heater with mechanical mixing under nitrogen flow on the surface. Five grams of low density polyethylene from Dow Chemical Company (LDPE 780E Melt flow rate 20) was added to the molten wax with mixing for ten minutes, then 0.25 grams of di-t-butyl peroxide (decomposition temperature 126° C.) was dissolved in the 20 grams cetyl alcohol and added portion wise within 60 minutes to the molten wax with efficient mixing under nitrogen flow stream. Heating was continued for about 2.5 hours. Samples were taken each 30 minutes the samples were evaluated by thermal gradient apparatus. Identical molten samples were left to solidify under similar conditions. The rate of solidification was taken as a rough measure of the heat storage efficiency. Selected samples were tested by DSC. The crystallinity of wax disappeared. The obtained product was completely amorphous but the measured heat capacity of the product was 17% higher than commercial wax at the same temperature range. The product was found to be compatible and emulsifiable with the carboxylated wax and its amine adducts. A representative DSC thermogram is shown in FIG. 4).

Example 11

Preparation of Sulfonated Active Waxes

Sulphonated wax is prepared by grafting sulphonated cation exchange resin waste as crushed powder (strong acidic cation) to the active waxes are prepared in Examples 1-5. Typical sample was prepared as following. The set up used in Example (1) was used. A 500 ml metal vessel was charged with 200 grams Paraffin wax from lubricating de-waxing unit of the petroleum refinery that contains 2.0% lubricating oil, was heated to 115° C.±5° C. by a thermostat controlled electric hot plate heater with mechanical mixing under nitrogen flow on the surface. Thirty grams of ground fine powder of Dow waste ion exchange resin (less than 75 micron) from Dow Chemical Company was added to the molten wax with mixing for ten minutes, then 0.5 grams of di-t-butyl peroxide (decomposition temperature 126° C.) was added portion wise within 60 minutes to the molten wax composite with efficient mixing under nitrogen flow stream. Heating was continued for about three hours. Samples were taken each 30 minutes the samples were evaluated by thermal gradient apparatus. Identical molten samples were left to solidify under similar conditions. The rate of solidification was taken as a rough measure of the heat storage efficiency. Products with different degrees of sulphonation were also prepared and evaluated by varying the ion exchange resin constituent added (as ground powder or degraded products as prepared in the following example.

Example 12

Preparation of Degraded Ion Exchange Resin Grafted onto Modified Paraffin Wax

Degraded ion exchange resin waste may be grafted on modified paraffin waxes. Three types of waste ion exchange resins were modified to be used as additives to the modified paraffin waxes prepared in Example 1 to Example 6; strong acidic sulphonate cation resin, weak acidic (polystyrene acrylate cross-linked) cationic resins, and anionic resins (polystyreneamino resins), all commercially available. Two hundred grams of waste ion exchange resins were wetted with 5% permanganate solution and left in contact with permanganate solution for about 48 hours. The partially swelled micro beads comprising permanganate swollen solution were heated at 275±5° C. for two hours in a rotating autoclave. At the end of the oxy-degradation time, the resin transformed to a semi viscous product. The product was cooled and mixed with different grades of paraffin waxes prepared in Examples 1 to Example 6 in 20-40% then 0.25% di-t-butyl peroxide was added portion wise within 1 hour with continuous mixing the grafting reaction was further continued 120° C. for about three hours. Samples were taken each 30 minutes. The samples were evaluated by thermal gradient apparatus. Identical molten samples were left to solidify under similar conditions. The rate of solidification was taken as a rough measure of the heat storage efficiency.

Example 13

Formulation by Physical Compounding

Several compositions from different active wax grades prepared in previous procedures Example 1 to Example 6 are formulated by physical compounding and are evaluated by DSC thermal analysis as integrative multi-functional new phase change material products based on paraffin wax.

Example 14

Compounding of Wax Compositions

Phase change materials with wax compositions Example 1 to Example 7 are compounded by rheometer with several different ratios of high density polyethylene (HDPE), low density polyethylene (LDPE), mixtures of both, recycled polymers, and waste materials from the polyethylene plants. Low molecular weights are also used in the preparation of some grades of phase change material to show good rheological properties.

Example 15

Preparation of a Master Batch Phase Change Material

Various wax compositions Example 1 to Example 7 are compounded by rheometer to produce phase change material master batch which can be added to any thermoplastic or thermoset material, or combinations thereof.

Products with optimum phase change material characteristics produced by the procedures shown in previous examples were casted to samples of fabricated products, i.e., sheets plates suitable for hot meals, granulated to pellets and placed in textile or polyethylene terephthalate bag for physiotherapic use as heat sink materials, and casted to heat sink for hot or cold drink containers.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A modified wax composition capable of storing or releasing energy upon a physical phase change transition, comprising:
    at least one support polymer;
    at least one amorphous wax; and
    at least one functional compound having a phase change active group, wherein the at least one functional compound is selected from the group consisting of fatty alcohol, unsaturated fatty alcohol, fatty acid, alkyl fatty ester, alkyl unsaturated fatty ester, fatty amine, unsaturated fatty amine, fatty amidoalkylamine, unsaturated fatty amidoalkylamine and combinations thereof,
    wherein about 1% to about 70% by weight of the at least one amorphous wax is covalently bonded to the at least one support polymer, the at least one functional compound and any combination thereof, and about 1% to about 70% by weight of the at least one functional compound is covalently bonded to the at least one support polymer, the at least one amorphous wax and any combination thereof.

2. The composition of claim 1, wherein the physical phase change transition occurs at a temperature of about 20° C. to about 60° C.

3. The composition of claim 1, wherein the at least one functional compound is $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl(COOR)(COOR'), and R and R' are independently $(C_1-C_{28})$alkyl, or a glyceride.

4. The composition of claim 1, wherein the at least one functional compound is $(C_{10})$alkyl(COOR)(COOR'), $(C_{10})$alkenyl(COOR)(COOR'), or combinations thereof; and R and R' are independently $(C_{10}-C_{28})$alkyl.

5. The composition of claim 1, wherein the at least one functional compound is $(C_{10}-C_{27})$alkyl-$CO_2R$, $(C_{10}-C_{27})$alkenyl-$CO_2R$, $(C_{10}-C_{26})$alkyl(COOR)(COOR'), $(C_{10}-C_{26})$alkenyl($CO_2R$)(COOR'), or combinations thereof; and R and R' are independently $(C_1-C_{28})$alkyl.

6. The composition of claim 1, wherein the at least one functional compound is $(C_{10}-C_{27})$alkyl-CONHR, $(C_{10}-C_{27})$alkenyl-CONHR, $(C_{10}-C_{26})$alkyl(CONHR)(CONHR'), $(C_{10}-C_{26})$alkenyl(CONHR')(CONHR'), $(C_{10}-C_{26})$alkyl(CONHR)($CO_2H$), $(C_{10}-C_{26})$alkenyl(CONHR)$CO_2H$, or combinations thereof;
    R and R' are independently $-(CH_2CH_2Y)_x-CH_2CH_2NH_2$;
    Y is NH, O, or S; and
    x is 0, 1, 2, 3, or 4.

7. The composition of claim 1, wherein the at least one functional compound is $(C_{10}-C_{28})$alkyl-$NR_1R_2R_3$, and $R_1$, $R_2$, and $R_3$ are independently hydrogen or $-(C_1-C_{28})$alkyl.

8. The composition of claim 1, further comprising at least one oxidized ion exchange resin grafted to the modified wax, wherein the at least one oxidized ion exchange resin is an oxidized strong acidic ion exchange resin, oxidized weak acidic ion exchange resin, oxidized weak basic ion exchange resin, or combinations thereof, wherein about 1% to about 70% by weight of the at least one oxidized ion exchange resin is covalently bonded therein.

9. The composition of claim 1, wherein the at least one amorphous wax is bayberry wax, beeswax, candelilla wax, carnauba wax, castor wax, ceresin waxes, douglas-fir bark wax, Fischer-Tropsch wax, japan wax, jojoba wax, lanolin, microcrystalline wax, montan wax, ouricury wax, ozokerite wax, paraffin wax, peat wax, petroleum wax, polyethylene wax, rice bran wax, spermaceti wax, chemically modified hydrocarbon wax, substituted amide wax, or combinations thereof.

10. The composition of claim 1, wherein the at least one amorphous wax is a paraffin wax.

11. The composition of claim 1, wherein the at least one support polymer is a polyolefin, a vinyl polymer, or combinations thereof.

12. The composition of claim 1, wherein the at least one support polymer is polyethylene, recycled polyethylene, waste polyethylene, or combinations thereof.

13. The composition of claim 1, wherein the at least one support polymer is polyethylene, and the at least one support polymer is present in the composition at a concentration of about 0.5 weight % to about 10 weight %.

14. The composition of claim 1, further comprising water.

15. The composition of claim 1, wherein the composition has a transition enthalpy of about 150 kJ/kg to about 250 kJ/kg as determined by differential scanning calorimetry.

* * * * *

UNITED STATES PATENT AND TRADEMARK OFFICE
CERTIFICATE OF CORRECTION

| | | |
|---|---|---|
| PATENT NO. | : 9,663,605 B2 | Page 1 of 1 |
| APPLICATION NO. | : 13/825858 | |
| DATED | : May 30, 2017 | |
| INVENTOR(S) | : Adam | |

It is certified that error appears in the above-identified patent and that said Letters Patent is hereby corrected as shown below:

In the Specification

In Column 8, Lines 10-11, delete "amide Saturated" and insert -- amide. Saturated --, therefor.

In Column 8, Line 25, delete "amine Some" and insert -- amine. Some --, therefor.

In Column 9, Line 32, delete "calorimetry" and insert -- Calorimetry --, therefor.

In Column 12, Line 17, delete "FIG. 3)" and insert -- FIG. (3) --, therefor.

In Column 14, Line 39, delete "FIG. 4)" and insert -- FIG. (4) --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*